United States Patent [19]

Johanson et al.

[11] Patent Number: 4,535,808

[45] Date of Patent: Aug. 20, 1985

[54] CHECK VALVE

[75] Inventors: Leonard T. Johanson, Algonquin, Ill.; Harry L. Forrester, Wheeling, W. Va.

[73] Assignee: Dicken Manufacturing Company, Siloam Springs, Ark.

[21] Appl. No.: 511,807

[22] Filed: Jul. 8, 1983

[51] Int. Cl.³ .............................................. F16K 15/06
[52] U.S. Cl. .................. 137/543; 137/533.21; 251/337; 251/368
[58] Field of Search ................ 137/542, 543, 533.21, 137/533.23, 533.25; 411/517, 521; 251/337

[56] References Cited

U.S. PATENT DOCUMENTS

| 338,215 | 3/1886 | Atwood . | |
|---|---|---|---|
| 678,271 | 7/1901 | Mueller | 137/533.21 X |
| 967,514 | 8/1910 | Groh . | |
| 1,497,726 | 6/1924 | Keenan . | |
| 1,568,940 | 1/1926 | Dooley | 137/543 |
| 1,939,128 | 12/1933 | Meyer . | |
| 1,942,417 | 1/1934 | Ferlin . | |
| 2,401,856 | 6/1946 | Brock | 411/517 |
| 2,594,641 | 4/1952 | Griffith | 137/543 |
| 2,870,784 | 1/1959 | Walls | 137/543 |
| 3,209,777 | 10/1965 | Salisbury . | |
| 3,441,051 | 4/1969 | Morse | 137/533.25 X |
| 3,811,470 | 5/1974 | Schaefer . | |
| 4,203,466 | 5/1980 | Hager | 137/543 |
| 4,368,756 | 1/1983 | Carlson | 137/543 X |

Primary Examiner—Robert G. Nilson
Attorney, Agent, or Firm—David D. Murray; Vincent L. Barker, Jr.

[57] ABSTRACT

A check valve particularly useful for water well applications. The valve components are positioned at the low pressure, downstream side of a flexible poppet. A flexible guide, shaped generally as an inverted top hat, snaps into place in an annular groove and responds to longitudinally directed forces from the water flow and a biasing spring to forcibly retain the guide in the groove. A stem affixed to the poppet slides within an aperture of the guide and restricts the poppet to generally longitudinal motion.

8 Claims, 8 Drawing Figures

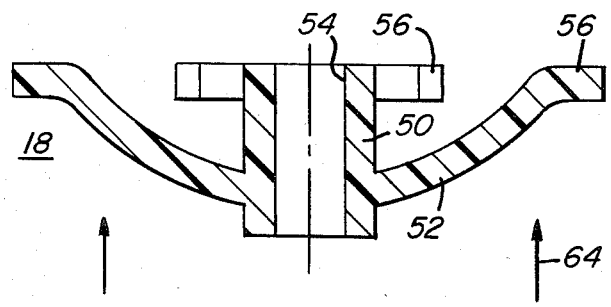
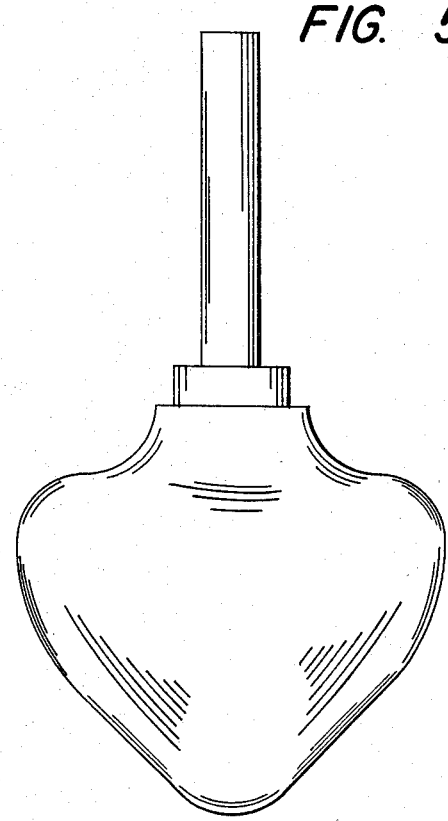
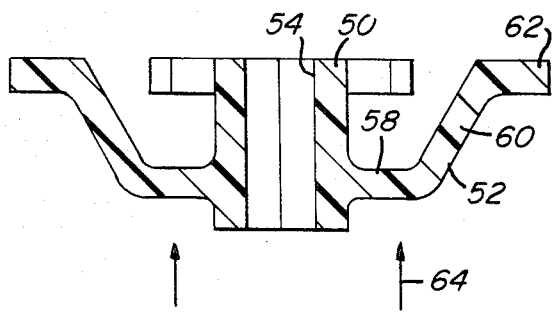
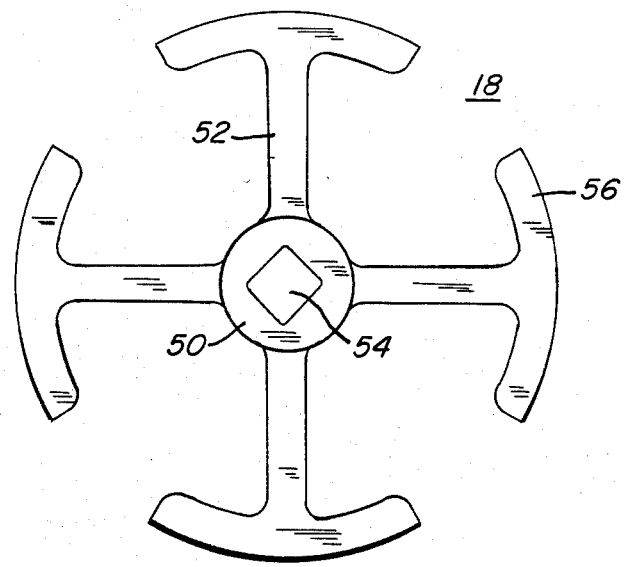

CHECK VALVE

BACKGROUND OF THE INVENTION

This invention relates to check valves and provides a check valve particularly adaptable to a low pressure water pumping system transferring water from an underground well to the ground surface for household or light commercial use.

Check valves of numerous types and varied application are well known. A particularly useful application is the insertion of such valves in water well systems to check the water flow and prevent backflow from a water tank or reservoir back into the well. Such check valves preferably exhibit good flow and pressure loss characteristics as is necessary for effective use on suction lines of shallow well jet or reciprocating pumps, on discharge lines of submersible pumps and in lines running between the pump and tank of deep well reciprocating pumps.

Check valves used in such applications often include components and design features which can result in sticking of the valve due to a buildup of debris from the pumped water, and which also can result in excessive wear of the components providing undesirable leakage, replacement requirements, and a limited life. Relatively high pressure drops are not uncommon. Many of the valve designs have numerous components, and include sacrificial O-rings and other seals, which also limit the operating life. Check valves in operation are often not readily repairable in the field, and require removal from the operating location for repair or parts replacement.

Exemplary of check valves which are particularly adaptable to water wells are those disclosed in U.S. Pat. No's 3,209,777 and 1,568,940.

While check valves have long been operating in water well applications, improvements can be made. It is particularly desirable to provide check valves with good pressure and flow characteristics, a limited number of parts, the capability for long life and yet ease of parts replacement, particularly remotely, and a limited possibility of sticking or related malfunctions.

SUMMARY OF THE INVENTION

This invention provides check valves particularly suitable for use in low pressure water well applications which valves are simple in design and operation. The valves include a limited number of component parts, are highly reliable, and allow for relatively simple remote replacement of components in the event of excessive wear. The structure promotes laminar flow and thus lower pressure drops than prior valves.

In preferred form a check valve in accordance with the invention includes a hollow body, preferably tubular and comprised of a metal, preferably brass. The body is internally or otherwise threaded at both the inlet and outlet ends for connection to water transporting piping. Inside the body, intermediate the threaded end portions, is an annular seat. Cut within the wall of the body and positioned between the seat and the outlet is an annular groove. The diameter of the groove is larger than the diameter of the outlet and of the corresponding threads.

The valve also includes a flexible guide comprised of a thermoplastic material, preferably an acetal copolymer. The preferred guide has a central hub and a plurality of arms extending radially from the hub. Each arm has a longitudinally extending portion to enhance flexibility. The extremity of each arm has a tip matingly sized to seat within the annular groove. The arms are configured to flex inwardly to a smaller outer diameter and allow for insertion of the guide into the body through the threaded outlet. The arms then flex outwardly and snap into a seated position within the groove. The hub of the guide includes an aperture along the longitudinal axis of the body. The guide is preferably shaped generally as an inverted top hat, and removal may require destruction of the guide.

A poppet and stem are positioned within the body such that the poppet can be sealingly positioned upon the annular seat and such that the stem extends through the longitudinal aperture in the guide. The cross sectional shape and sizing of the stem and the aperture are selected so that the hub aperture laterally supports the stem while allowing the stem to slide axially and to allow a cleansing water flow between the stem and aperture. The poppet is preferably of a U-shaped or heart cross section and is comprised of a flexible thermoplastic material such as an acetal copolymer. The shape promotes laminar flow. The stem is attached to the poppet through a knurled surface. A light helical spring is disposed about the stem and biases the poppet toward a seated position. The spring reacts against the hub of the guide and, because of the shape of the arms of the guide, biases the guide toward a restrained position within the groove.

With this configuration, all of the working components of the valve are on the outlet side of the valve, downstream of the poppet. During normal operation the poppet is maintained seated by gravity and the force of the biasing spring. When flow through the valve is desired a pressure differential upstream and downstream of the poppet is created, for example through the activation of a down-hole pump and/or opening of a valve on the ground surface, and the poppet then lifts from its seat in response to the pressure from the water flow. The poppet, the seat and the body are configured so that water flowing across the seat can expand into a chamber of enlarged cross section, further promoting a laminar flow condition and hence lower pressure losses. The flow across the arms of the guide provides a force, similar to that of the spring, tending to seat the guide in the groove.

The poppet moves longitudinally within the valve body, being guided by the interaction of the stem and the hub aperture. Water also flows through the aperture, washing away any grit or debris which has a tendency to collect on the components. The outwardly expanding shape of the poppet and an angled orientation of the seat also tend to assure a sealed interaction even upon localized deterioration of the poppet.

The configuration and material of the guide not only allow sufficient flexibility for initial assembly of the valve internals, but also advantageously allow for simple and if necessary remote replacement of components. The guide need merely be gripped about the hub, for example by the fingers or by a tool, and snapped from its seated position in the groove for removal. The other internals are then removable by gripping and lifting of the stem. All of the internals can also be removed from the body in a single operation through gripping and lifting of the stem. Action of the poppet against the under side of the guide, particularly the hub, will snap the guide from the groove.

The disclosure therefore provides a reliable, simple, and low pressure loss water system check valve which is simple in operation, easy to install, and readily remotely repairable.

BRIEF DESCRIPTION OF THE DRAWINGS

The advantages, nature and additional features of the invention will become more apparent from the following description, taken in conection with the accompanying drawings, in which:

FIG. 5 is a front view of an alternate stem and poppet;

FIGS. 6 and 7 are respectively a top and a sectional elevation view of the guide of the valve of FIG. 1; and FIG. 8 is a sectional elevation view of an alternative guide in accordance with the invention.

Referring now to FIG. 1 there is shown one preferred embodiment of a check valve 10 in accordance with the invention. The valve 10 inclues a body 12, a ball check or poppet 14, a stem 16, a guide 18 and a spring 20.

Figure 1:
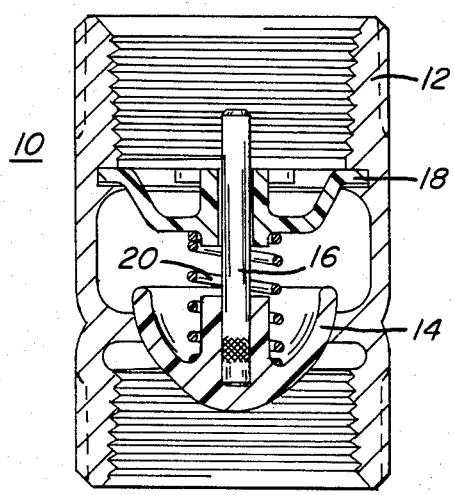
FIG. 1 is a cross sectional view, in elevation, of a check valve in accordance with the invention.
Figure 2:
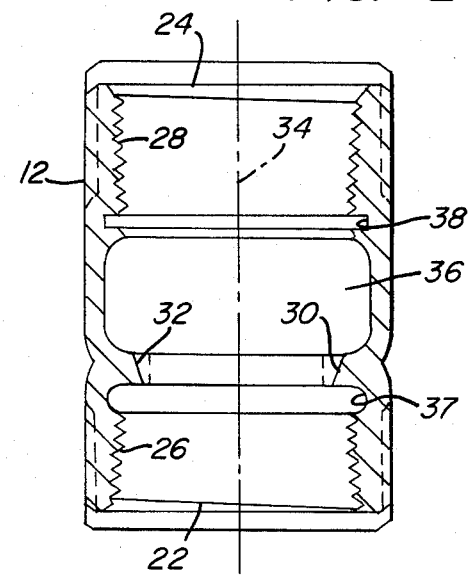
FIGS. 2 and 3 are respectively a longitudinal section view and a bottom view of the body of the valve of FIG. 1.
Figure 3:
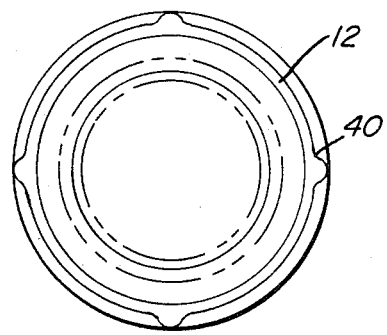

The body 12, shown in FIGS. 1, 2 and 3, is annular and open at both ends forming an inlet 22 and an outlet 24. The body includes means for affixing the valve 10 to water transporting piping (not shown) such as interior threads 26 at the inlet 22 and interior threads 28 at the outlet 24. It is envisioned that in some applications external threads will be used at both the inlet and outlet, and in yet other applications an internal thread at one end and an external thread at the other will be desirable. In an exemplary 1¼ inch check valve 10, the outer envelope of the body 12 is a two inch diameter circle, three inches in length.

Integral with and disposed within the body 12 is an annular valve seat 30. The seat 30 includes a surface 32 positioned at an angle $\alpha$ to a longitudinal axis 34 of the body 12, an exemplary angle $\alpha$ being approximately twenty degrees.

A relief 37 is formed within the body at the inlet side of the valve seat 30 during the machining process to alleviate the need for a deburring operation.

At the outlet side of the valve seat 30 the body forms a flow chamber 36 which is of enlarged diameter with respect to the flow area of the valve seat 30. The flow chamber 36 is sufficiently large to maintain laminar flow conditions within the valve 10 and hence low pressure losses. The configuration shown in the Figures achieves a maximum flow rate condition for a body of a given outer diameter since the minimum volume restriction area is maximized.

Between the flow chamber 36 and the outlet is an annular groove 38. The groove is sized to receive the guide 18. The groove in the exemplary valve is 1.735 to 1.750 inches in diameter, which is noticeably larger than the core diameter, that is, the internal I.D. across the threads, of 1-7/16 inches. The exterior of the body 12 includes means for gripping and turning the body, such as flat hexagonal outer surfaces or preferably four or six wrench grips 40. The body is metallic, preferably $\pi$81 brass, which is formed from a casting and subsequently tapped, reamed and cut.

Figure 4:
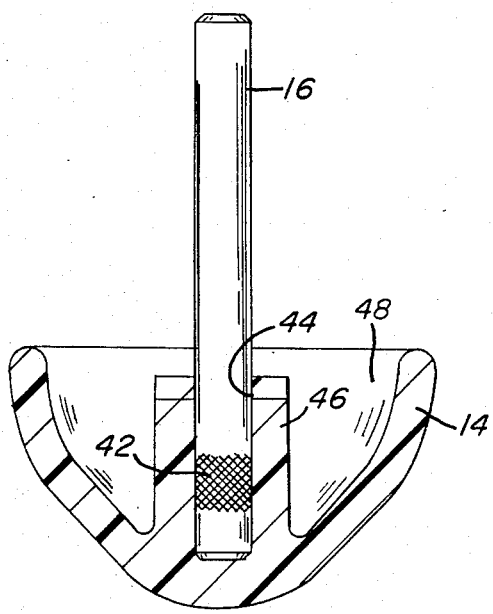
FIG. 4 is a section view of a stem and poppet in accordance with the invention.

The preferred poppet 14 and stem 16 are shown in FIGS. 1 and 4. The stem is a metallic rod, preferably circular in cross section, having a knurl 42 which is securely held within a bore 44 of the poppet 14. The stem 16 is preferably comprised of stainless steel.

The poppet 14 is comprised of a flexible and light weight material, preferably thermoplastic such as an acetal copolymer. In preferred form for the exemplary 1¼ inch diameter check valve 10, the poppet wall thickness is ⅛ inch. The preferred poppet 14 has a generally U-shaped cross section, as shown, and includes a central rib 46 which receives the stem 16. An annular cavity 48 is formed about the rib 46. When the valve is closed and the cavity 48 is filled with fluid, the thin wall of the poppet is continually forced against the valve seat 30, maintaining a sealed interconnection.

FIG. 5 shows an alternate stem 16' and poppet 14' subassembly. The stem is metallic and the poppet is also of a flexible and light weight acetal copolymer. The poppet is generally heart-shaped, as shown, such that the profile provides a flow pattern of low pressure loss. The poppet material is sufficiently flexible to accommodate some wear or misalignment while maintaining a sealed interconnection with the valve seat.

The guide 18 is shown in FIGS. 1, 6 and 7 and is also comprised of a light weight and flexible thermoplastic material such as an acetal copolymer. The guide 18 includes a central hub 50 and a plurality of arms 52 extending outwardly and longitudinally upwardly from the hub 50. The hub has an aperture 54 extending therethrough which functions to receive and guide the stem 16 as it slides longitudinally within the aperture 54. The cross sectional configurations of the stem 16 and aperture 54 are different so as to establish flow paths through the aperture, and about the stem, and thus flush from the aperture particles and grit which otherwise tend to collect in the aperture. In the exemplary check valve the aperture is square, 0.190 to 0.200 inches across flats, and the stem is cylindrical of a diameter of 0.186 to 0.189 inches.

The arms 52 are sized and configured to matingly be positioned and supported within the annular groove 38. In the exemplary valve the peripheral diameter of the guide 18 is 1.750 to 1.765 inches. Preferably tips 56 at the end of each arm are arcuate to compatibly seat within the groove 38. The arms 52 not only extend outwardly or radially from the hub, but also extend in a direction parallel to the longitudinal axis of the valve 10. The guide in the exemplary valve, as shown best in FIG. 7, thus includes an inner radial segment 58, a generally longitudinally extending segment 60, and an outer radial segment 62. The longitudinally extending segment of each arm is required to transfer forces applied to the guide in a longitudinal direction from valve inlet toward outlet, as depicted by the arrows 64, into radially outward forces at the ends of the arms. This ensures that the guide 18 remains seated in the groove 38.

An alternative guide 18 is shown in FIG. 8, and similarly includes a hub 50 with an aperture 54, and tips 56. The arms 52, however, are arcuate, and also function to transfer flow induced forces to generally radially outwardly directed forces at the tips 56 so as to retain the guide 18 in the groove 38. This retaining force can be increased by roughening the lower surface of the arms 52 and the hub 54 to provide additional surface area, although it is preferred to maintain a smooth guide surface to minimize pressure losses. Many other guide configurations are possible which transfer forces from a longitudinal to a radially outward direction.

In addition to the transfer of forces during operation to retain the guide in position, it will be apparent that the longitudinal segments or portions of the arms 52 assist in the flexing action of the guide during installation into the body 12. The guide configuration, herein referred to as an inverted top hat, thus allows simple snap-in installation during initial assembly or in the field. As a result of the inverted top hat configuration, removal of the guide may require destructive cracking of the component.

The spring 20, shown in FIG. 1, is helical, and acts to provide a longitudinal force downwardly onto the poppet 14 and upwardly onto the guide 18. Directional terms such as upwardly or downwardly, as used herein, refer to those directions with respect to the valve 10 as oriented in the Figures. It is to be understood, however, that the valve 10 can be utilized in any other orientation. The spring 20 functions to bias the poppet 14 toward the seat 30, and also to bias the guide 18, through the force directional transfer previously discussed, into a retained position in the groove 38. The biasing force of the spring should be minimized so as to minimize the restraint on flow when water is passing through the valve 10. In the exemplary 1¼ inch check valve the spring 20 is comprised of monel, has a 1¼ inch free length and is rated at ¼ pound.

It will be apparent that many modifications and additions to the disclosed valve are possible without departing from the spirit and scope of the invention. It therefore is intended that the foregoing description and Figures be taken as illustrative, and not in a limiting sense.

We claim:

1. A check valve adaptable to threaded pipe comprising:
   a generally tubular body having a longitudinal axis, an inlet section, an outlet section, an intermediate interior section, an annular valve seat disposed between said intermediate section and said inlet section, said valve seat being angled with respect to said longitudinal axis, and a circumferential groove disposed between said intermediate section and said outlet section, said groove being of larger outside diameter than the interior diameter of said outlet section;
   a flexible guide fabricated of an acetal copolymer and having a hub defining a longitudinal aperture having a square cross section and a plurality of arms extending outwardly therefrom, one of said arms having a first generally radially extending portion coupled to a second circumferentially extending portion having arcuate outer edges;
   a poppet fabricated of an acetal copolymer and having a smoothly curved face and movable within said body between a first position whereat said poppet is seated upon said valve seat and a second position whereat said poppet is lifted from said valve seat;
   a metallic stem secured to said poppet opposite said face and disposed for sliding motion within said aperture, said stem having a circular cross section; and
   means reacting against said guide and said poppet for biasing said poppet toward said first position.

2. The check valve of claim 1 wherein said biasing means comprises a coiled spring.

3. The check valve of claim 1 wherein said intermediate interior section is of larger cross sectional area than said valve seat and said inlet section.

4. The check valve of claim 1 further including means for biasing said circumferentially extending portions of said arms into said groove.

5. The check valve of claim 1 wherein said poppet defines a blunt, smoothly curved conical outer surface.

6. A check valve comprising:
   a generally tubular body having a longitudinal axis, an inlet and an outlet, means for affixing conduits to each of said inlet and outlet, an annular rim within said body forming a valve seat at an angle to said axis and an internal annular groove;
   a flexible guide fabricated of an acetal copolymer having a hub and a plurality of arms extending radially therefrom and each of said arms having a circumferentially extending arm portion being sized and configured to compress upon insertion into said body through said outlet and to then expand into a seated position within said groove, said hub having a longitudinal aperture extending therethrough and defining a square cross section;
   a poppet and stem disposed within said body, said stem fabricated of metal and being positioned to longitudinally slide within said aperture, said stem having a circular cross section, said poppet fabricated of an acetal copolymer and having a smoothly curved face opposite said stem being movable between a seated position upon said valve seat and an open position spaced from said valve seat; and
   means for biasing said poppet toward said seated position, said biasing means reacting against said guide.

7. The check valve of claim 6 further including means for biasing said circumferentially extending portions of said arms into said groove.

8. The check valve of claim 6 wherein said poppet defines a blunt, smoothly curved conical outer surface.

* * * * *